United States Patent Office 2,957,031
Patented Oct. 18, 1960

2,957,031

SELECTED FLUOROALKYL AROMATIC COMPOUNDS AND THEIR PREPARATION

John J. Drysdale, Wilmington, Del., assignor to E. I. du Pont de Nemours and Company, Wilmington, Del., a corporation of Delaware No Drawing. Filed June 16, 1958, Ser. No. 742,037

19 Claims. (Cl. 260—612)

This invention relates to fluorinated organic compounds. More particularly, it relates to aromatic compounds having highly fluorinated alkyl substituents and to the preparation thereof.

Aromatic compounds having perfluoroalkyl groups of 1 to 3 carbons and with a total of not more than 4 perfluorinated carbons in all substituent groups are known. However, the hitherto-known methods for making these fluoralkyl-substituted aromatic compounds are complicated (they require several steps) and are not as economical as desired for practical purposes. These known fluoroalkyl-substituted aromatic compounds are reported to possess considerable thermal stability; they are, however, too volatile to be satisfactory for use in many desired applications of stable fluids.

An object of the invention is, therefore, to provide an improved method for preparing fluoroalkyl-substituted aromatic compounds which is simple and economical and is capable of producing a wide variety of stable compounds having low volatility from readily-available starting materials.

Another object is the provision of certain novel and useful fluorinated compounds.

Pursuant to the above-mentioned and yet other objects, an improved general method for making polyfluoroalkyl aromatic compounds is now provided. This novel process comprises heating an acid halide of the formula $$X R_f \underset{\underset{O}{\|}}{C} Y$$

wherein X is hydrogen, chlorine or fluorine, $R_f$ is a perfluoroalkylene radical, Y is a halogen of atomic number at least 17, i.e., chlorine, bromine or iodine, with an aromatic compound containing at least one hydrogen attached to the aromatic nucleus and nickel carbonyl at a temperature between 100° and 200° C.

The polyfluoroalkyl aromatic compounds of the formula $XR_f Ar$, wherein X is hydrogen, chlorine or fluorine, $R_f$ is a perfluoroalkylene radical containing at least 8 carbon atoms and Ar is a monovalent aromatic radical, are new compounds and are also a part of this invention.

An especially preferred group of the products of this invention is composed of compounds of the above formula in which Ar represents a monovalent aromatic radical containing, in addition to the polyfluoroalkyl substituent ($XR_f$), another substituent consisting of halogen, perfluoroalkyl and omega-hydroperfluoroalkyl, the polyfluoroalkyl radicals containing from 1 to 24 carbon atoms.

The process of the invention is conveniently carried out in a reaction vessel capable of withstanding the pressure developed by the reaction mixture under the reaction conditions. The vessel is charged with a polyfluoroacyl halide of the formula given above, e.g., perfluorobutyryl chloride, an aromatic compound of the type defined above, e.g., benzene, and at least one mole of nickel carbonyl for every two moles of polyfluoroacyl halide employed, and the mixture is heated in the closed reaction vessel at a temperature between 100° and 200° C., preferably at 125–175° C. The heating is continued until the pressure in the reaction vessel reaches a constant value. As the reaction between the acyl halide, nickel carbonyl, and the aromatic compound proceeds, carbon monoxide is formed, and this causes an increase in the reaction pressure. Reaction times ranging from 1 hour to 24 hours are generally required, the longer times being necessary when the lower operating temperatures are used.

The process described is illustrated by the following equation showing the reaction of perfluorobutyryl chloride and benzene with nickel carbonyl:

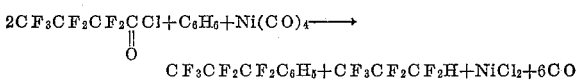

The proportions of the reactants employed can be varied widely. An excess of nickel carbonyl, i.e., more than one mole of nickel carbonyl per two moles of polyfluoroacyl halide employed, is preferred. An excess of 50–100% of nickel carbonyl is quite satisfactory. When aromatic compounds that are distillable are employed, it is preferred to use an excess of the aromatic compound, e.g., from 2–20 moles of aromatic compound to one mole of polyfluoroacyl halide. This results in a more efficient use of the more expensive polyfluoroacyl halide, and the excess aromatic compound can be removed from the reaction mixture after the reaction is completed. However, when a solid aromatic compound is being employed and a solid product is produced, it is preferred to use equimolar amounts of the polyfluoroacyl halide and the aromatic compound in order to minimize the separation problem involved in separating excess solid reactants from solid reaction products. When more than one polyfluoroalkyl group is to be introduced into the aromatic compound, an excess of the polyfluoroacyl halide is employed, amounts ranging from 2 to 5 moles of polyfluoroacyl halide per mole of aromatic compound being preferred.

After the reaction is completed, the reaction vessel and its contents are cooled and the reaction mixture is subjected to fractional distillation to isolate volatile products. When nonvolatile products are formed, they can be separated by fractional crystallization. If desired, the crude reaction mixture can be filtered to remove solid reaction by-products prior to distillation.

The polyfluoroacyl chlorides and bromides used as starting materials in the process of this invention can be made from the corresponding polyfluoroalkanoic acids by treatment with halogenating agents, e.g., thionyl chloride and phosphorus tribromide. Polyfluoroacyl iodides can be prepared by reaction of a polyfluoroacyl chloride with calcium iodide. Detailed descriptions of the preparation of polyfluoroalkanoic acids and their conversion to acyl halides are given in U.S. Patents 2,559,629 and 2,559,630. The nickel carbonyl and the aromatic compounds used in the process of this invention can be the ordinary grades of materials of good quality commercially available.

The invention is illustrated in further detail by the following examples in which the proportions of ingredients are expressed in parts by weight unless otherwise specified.

EXAMPLE I

*Preparation of (n-perfluoropropyl)benzene*

A stainless steel reaction vessel, having a capacity of 500 parts of water and capable of being agitated, is charged with 46 parts of perfluorobutyryl chloride, 34 parts of nickel carbonyl and 176 parts of benzene, then closed and heated at 150° C. with agitation for 6 hours. The reaction mixture is then cooled and filtered to remove solid by-products, and the filtrate is fractionally distilled. There is obtained 18–20 parts of (n-perfluoropropyl)benzene, boiling at 128° C. and having a refractive index, $n_D^{25}$, of 1.3765. Infrared and nuclear magnetic resonance analyses are consistent with the indicated structure, and the physical characteristics agree with those reported in the literature.

EXAMPLE II

Preperation of (n-perfluoropropyl)toluene

A pressure vessel of the type described in Example I is charged with 70 parts of perfluorobutyryl chloride, 50 parts of nickel carbonyl and 174 parts of toluene, then closed and heated at 150° C. with agitation for 12 hours. After cooling, the reaction mixture is filtered, and the filtrate is fractionally distilled. There is obtained 30 parts (corresponding to a 70–80% yield) of (n-perfluoropropyl)toluene, boiling at 87–89° C./100 mm. A sample of this product purified by gas chromatography has a refractive index, $n_D^{25}$, of 1.3905.

*Analysis.*—Calc'd for $C_{10}H_7F_7$: F, 51.08%. Found: F, 50.54%.

Infrared and nuclear magnetic resonance analyses confirm the indicated structure of this product. The nuclear magnetic resonance analysis indicates that at least two isomers are present.

EXAMPLE III

Preparation of (n-perfluoropropyl)trifluoromethylbenzene

Using the apparatus and procedure of the previous examples, a mixture of 70 parts of perfluorobutyryl chloride, 35 parts of nickel carbonyl and 180 parts of trifluoromethylbenzene is heated at 150° C. with agitation for 8 hours. On working up the reaction mixture in the usual manner, there is obtained 10 parts of (n-perfluoropropyl)trifluoromethylbenzene, boiling at 138° C. and having a refractive index, $n_D^{25}$, of 1.3595. The infrared and nuclear magnetic resonance analyses of this product are consistent with the indicated structure. The product is purified by gas chromatography for elemental analysis.

*Analysis.*—Calc'd for $C_{10}H_4F_{10}$: F, 60.48%. Found: F, 60.03%.

EXAMPLE IV

Preparation of (n-perfluoropropyl)bromobenzene

A mixture of 46 parts of perfluorobutyryl chloride, 100 parts of bromobenzene and 35 parts of nickel carbonyl are reacted under the conditions described in Example III. On working up the reaction mixture in the same way, there is obtained 12 parts, corresponding to a 30–40% yield, of (n-perfluoropropyl)bromobenzene, boiling at 174° C. A portion of this product is purified by gas chromatography for analysis.

*Analysis.*—Calc'd for $C_9H_4F_7Br$: C, 32.26%; H, 1.24%; F, 40.92%. Found: C, 33.59%; H, 1.57%; F, 40.38%.

Infrared and nuclear magnetic resonance analyses are consistent with the indicated structure of this product. The nuclear magnetic resonance analysis also indicates that at least two isomers are present.

EXAMPLE V

Preparation of (n-perfluoropropyl)anisole

Uusing the procedure described in Example III, a mixture of 70 parts of perfluorobutyryl chloride, 35 parts of nickel carbonyl and 200 parts of anisole is heated at 150° C. for 4 hours. On working up the reaction mixture in the usual manner, there is obtained 15 parts of (n-perfluoropropyl)anisole corresponding to a yield of 35–40%, boiling at 96° C./40 mm. The sample of this product is purified by gas chromatography for analysis. Nuclear magnetic resonance analysis shows $CH_3O$— and aromatic protons in a 3:4 ratio and a $CF_3CF_2CF_2$— group (two sets of resonances indicating two isomers).

EXAMPLE VI

Preparation of (n-perfluoropropyl)benzene and bis(n-perfluoropropyl)benzene

A reaction vessel of the type described in the preceding examples is charged with 22 parts of benzene, 93 parts of perfluorobutyryl chloride and 35 parts of nickel carbonyl and is heated at 150° C. for 8 hours. After cooling, the reaction mixture is filtered to remove solid by-products and the filtrate is fractionally distilled. There is obtained 25 parts, corresponding to a yield of 50% of theory, of (n-perfluoropropyl)benzene, boiling at 128° C. and 4 parts, corresponding to a yield of 10%, of bis(n-perfluoropropyl)benzene boiling at 145° C. The properties of (n-perfluoropropyl)benzene are the same as those of the product of Example I. The bis(n-perfluoropropyl)benzene is identified by elemental analysis and infrared and nuclear magnetic resonance analyses.

*Analysis.*—Calc'd for $C_{12}H_4F_{14}$: C, 34.80%; H, 0.97%; F, 64.23%. Found: C, 35.64%; H, 1.54%; F, 62.85%.

The infared and nuclear magnetic resonance analyses are consistent with the indicated structures.

EXAMPLE VII

Preparation of (n-perfluoropropyl)naphthalene, bis(n-perfluoropropyl)naphthalene, and bis(n-perfluoropropyl)dihydronaphthalene A stainless steel reaction vessel is charged with 12 parts of naphthalene, 70 parts of perfluorobutyryl chloride, and 25 parts of nickel carbonyl, and after closing, is heated at 150° C. with agitation for 8 hours. After cooling, the reaction vessel is opened and the reaction mixture is agitated with a mixture of 100 parts of diethyl ether and 100 parts of water. The ether layer is separated and then subjected to fractional distillation. There is obtained 4 parts of (n-perfluoropropyl)naphthalene, B.P. 104° C./12 mm. and 5 parts of a mixture of bis(n-perfluoropropyl)naphthalene and bis(n-perfluoropropyl)dihydronaphthalene, boiling at 116–122° C./12 mm. Nuclear magnetic resonance analyses of these products are consistent with the indicated structures.

EXAMPLE VIII

Preparation of (n-perfluoropropyl)durene

The process of Example VII is repeated with a mixture of 14 parts of durene (1,2,4,5-tetramethylbenzene), 46 parts of perfluorobutyryl chloride, and 17 parts of nickel carbonyl. There is obtained 5 parts of crude reaction product boiling at more than 110° C. at 25 mm. pressure. This product is redistilled, and the following fractions are obtained:

| Fraction (1.0 part ea.) | Boiling Point at 25 mm., ° C. | Refractive Index, $n_D^{25}$ |
| --- | --- | --- |
| 1 | 110–120 | |
| 2 | 120–130 | 1.4600 |
| 3 | 130–136 | 1.4340 |
| 4 | 136 | 1.4232 |

Nuclear magnetic resonance analyses of Fractions 2, 3, and 4 indicate that they have the following compositions (proportions expressed in percent by weight):

| Fraction | 1,2,4,5-Tetramethyl-3 (n-perfluoropropyl)-benzene | 1,2,5-trimethyl-4 (n-perfluoropropyl)-methylbenzene |
| --- | --- | --- |
| | Percent | Percent |
| 2 | 65 | 35 |
| 3 | 15 | 85 |
| 4 | 5 | 95 |

EXAMPLE IX

*Preparation of (omega-hydroperfluorodecyl)benzene*

The procedure of Example III is repeated using 56 parts of omega-hydroperfluoroundecanoyl chloride, 174 parts of benzene, and 8.5 parts of nickel carbonyl. The reaction mixture is worked up as in Example III, and there is obtained 24 parts, corresponding to a 90% yield, of (omega-hydroperfluorodecyl)benzene, boiling at 193° C. and melting at 43° C.

*Analysis.*—Calc'd for $C_{16}H_6F_{20}$: C, 33.23%; H, 1.05%; F, 65.72%. Found: C, 33.03%; H, 1.31%; F, 65.79%.

Infrared and nuclear magnetic resonance analyses are consistent with the indicated structure of this product.

The examples have illustrated the process of this invention by reference to the reaction of nickel carbonyl with specific fluorinated acyl halides and specific aromatic compounds. However, the invention is generic to the reaction of nickel carbonyl with any fluoroacyl halide of the formula $XR_fCOY$ (wherein X is hydrogen, chlorine or fluorine, $R_f$ is a perfluoroalkylene radical, preferably having 1–24 carbon atoms, and Y is chlorine, bromine or iodine), with an aromatic compound containing at least one hydrogen atom attached to the aromatic nucleus. Thus, when the fluoroacyl halides listed in the first column of the following table and the aromatic compounds listed in the second column of the table are reacted with nickel carbonyl under the conditions defined hereinbefore, the specific fluoroalkyl aromatic compounds listed in the third column of the table are obtained.

| Fluoroacyl Halide | Aromatic Compound | Fluoroalkyl Aromatic Compound |
|---|---|---|
| 25-hydroperfluoropentacosanoyl chloride. | benzene | (24-hydroperfluorotetracosyl)benzene. |
| perfluorooctanoyl chloride. | do | (perfluoroheptyl)benzene. |
| perfluorobutyryl bromide. | chrysene | (perfluoropropyl)chrysene. |
| perfluorobutyryl chloride. | phenanthrene | (perfluoropropyl)phenanthrene. |
| 11-hydroperfluorohendecanoyl chloride. | anthracene | (10-hydroperfluorodecyl)-anthracene. |
| 7-hydroperfluoroheptanoyl chloride. | 2-methoxynaphthalene. | (6-hydroperfluorohexyl)-methoxynaphthalene. |
| perfluorooctanoyl chloride. | 3-methylphenanthrene. | (perfluoroheptyl)methylphenanthrene. |
| 5-hydroperfluorovaleryl iodide. | benzene | (4-hydroperfluorobutyl)-benzene. |
| 25-hydroperfluoropentacosanoyl chloride. | 10-hydroperfluorodecyl-anthracene. | (10-hydroperfluorodecyl)-(24-hydroperfluorotetracosyl)anthracene. |
| perfluorobutyryl chloride. | anthracene | tetrakis(perfluoropropyl)-benzene. |
| 5-chloroperfluorovaleryl chloride. | benzene | (4-chloroperfluorobutyl)-benzene. |
| 7-chloroperfluoroheptanoyl chloride. | do | (6-chloroperfluorohexyl)-benzene. |

The polyfluoroalkyl aromatic compounds made by the process of this invention have utility in various applications. They are especially useful as nonvolatile stable fluids. Their suitability for use as stable fluids is shown by the following thermal stability tests: A sample of (ω-hydroperfluorodecyl)benzene (M.P. 42–43° C.) heated at reflux (256° C., uncorrected) for 4 hours is unaffected by such treatment. At the end of this heating period the liquid was water-white, and after cooling it was found to melt at the same temperature as the starting material, i.e., 42–43° C. Likewise, a sample of trifluoromethylperfluoropropyl-ω-hydroperfluorodecylbenzene heated at reflux temperature (192° C., uncorrected) for 4 hours is unaffected. The refractive index of the material was 1.3470 at the start and also at the end of heating. The reflux temperature remained constant during the test and there was no discoloration of the material.

The polyfluoroalkyl aromatic compounds are also useful as chemical intermediates. More particularly, they are valuable intermediates in the formation of surfactants. For example, (n-perfluoropropyl)benzene treated with 20% fuming sulfuric acid gives (n-perfluoropropyl) benzenesulfonic acid, B.P. 162° C./1 mm. A 1% aqueous solution of this polyfluoroalkylbenzenesulfonic acid wets sulfur effectively, and it can also be employed as an emulsifying agent in the polymerization of tetrafluoroethylene.

As indicated previously, the process of this invention possesses significant advantages over the hitherto known methods of making perfluoroalkyl aromatic compounds. It is a general method for introducing one or more polyfluoroalkyl groups into an aromatic nucleus, and the polyfluoroalkyl groups introduced can have up to 24 carbon atoms. Furthermore, the process is carried out in one step from readily-available starting materials.

Since obvious modifications in the invention will be evident to those skilled in the chemical arts, I propose to be bound solely by the appended claims.

The embodiments of the invention in which an exclusive property or privilege is claimed are defined as follows:

1. A compound of the formula $XR_fAr$, wherein X is a member of the group consisting of hydrogen, chlorine and fluorine, $R_f$ is a perfluoroalkylene radical containing at least 8 carbons, and Ar is a monovalent aromatic hydrocarbon radical.

2. A compound of the formula $XR_fAr$, wherein X is a member of the group consisting of hydrogen, chlorine and fluorine, $R_f$ is a perfluoroalkylene radical containing at least 8 carbons, and Ar is a monovalent aromatic radical hydrocarbon except for a single substituent, said substituent being selected from the class consisting of halogen, lower alkoxy, and perfluoroalkyl and omega-hydroperfluoroalkyl radicals of 1–24 carbons.

3. (n-Perfluoropropyl)anisole.

4. Omega-hydroperfluorodecylbenzene.

5. The process of preparing a fluoroalkyl aromatic compound which comprises heating together, at a temperature of about 100–200° C., (1) an acid halide of the formula $$XR_f\underset{\underset{O}{\|}}{C}Y$$

wherein X is a member of the group consisting of hydrogen, chlorine and fluorine, $R_f$ is a perfluoroalkylene radical, and Y is a halogen with an atomic number of at least 17, (2) an aromatic compound containing at least one hydrogen attached to the aromatic nucleus, and (3) nickel carbonyl.

6. The process of claim 5 wherein the aromatic compound is benzene.

7. The process of claim 5 wherein the aromatic compound is toluene.

8. The process of claim 5 wherein the aromatic compound is bromobenzene.

9. The process of claim 5 wherein the aromatic compound is anisole.

10. The process of claim 5 wherein the aromatic compound is naphthalene.

11. The process of claim 5 wherein the aromatic compound is durene.

12. The process of preparing a fluoroalkyl aromatic compound which comprises heating together perfluorobutyryl chloride, benzene and nickel carbonyl at 100–200° C.

13. The process of preparing a fluoroalkyl aromatic compound which comprises heating together perfluorobutyryl chloride, toluene and nickel carbonyl at 100–200° C.

14. The process of preparing a fluoroalkyl aromatic compound which comprises heating together perfluorobutyryl chloride, trifluoromethylbenzene and nickel carbonyl at 100–200° C.

15. The process of preparing a fluoroalkyl aromatic compound which comprises heating together perfluorobutyryl chloride, bromobenzene and nickel carbonyl at 100–200° C.

16. The process of preparing a fluoroalkyl aromatic compound which comprises heating together perfluorobutyryl chloride, anisole and nickel carbonyl at 100–200° C.

17. The process of preparing a fluoroalkyl aromatic compound which comprises heating together perfluorobutyryl chloride, naphthalene and nickel carbonyl at 100–200° C.

18. The process of preparing a fluoroalkyl aromatic compound which comprises heating together perfluorobutyryl chloride, durene and nickel carbonyl at 100–200° C.

19. The process of preparing a fluoroalkyl aromatic compound which comprises heating together omega-hydrofluoroundecanoyl chloride, benzene and nickel carbonyl at 100–200° C.

References Cited in the file of this patent

UNITED STATES PATENTS 2,862,974    Sieglitz et al. _____ Dec. 2, 1958